(12) United States Patent
Lessing (10) Patent No.: US 8,654,085 B2
(45) Date of Patent: Feb. 18, 2014

(54) MULTIDIMENSIONAL NAVIGATION FOR TOUCH SENSITIVE DISPLAY

(75) Inventor: Simon Lessing, Malmo (SE)

(73) Assignees: Sony Corporation, Toyko (JP); Sony Mobile Communications AB, Lund (SE)

(*) Notice: Subject to any disclaimer, the term of this patent is extended or adjusted under 35 U.S.C. 154(b) by 937 days.

(21) Appl. No.: 12/194,664

(22) Filed: Aug. 20, 2008

(65) Prior Publication Data

US 2010/0045608 A1    Feb. 25, 2010

(51) Int. Cl.
*G06F 3/041*    (2006.01)

(52) U.S. Cl.
USPC .............................. 345/173; 345/174; 345/175

(58) Field of Classification Search
USPC .................................. 345/156–172, 173–178
See application file for complete search history.

(56) References Cited

U.S. PATENT DOCUMENTS

| | | | |
|---|---|---|---|
| 6,340,979 B1* | 1/2002 | Beaton et al. | 715/764 |
| 7,800,592 B2* | 9/2010 | Kerr et al. | 345/173 |
| 2003/0076306 A1* | 4/2003 | Zadesky et al. | 345/173 |
| 2004/0204129 A1* | 10/2004 | Payne et al. | 455/566 |
| 2004/0207606 A1 | 10/2004 | Atwood et al. | |
| 2004/0263488 A1* | 12/2004 | Martin | 345/173 |
| 2006/0044280 A1* | 3/2006 | Huddleston et al. | 345/173 |
| 2006/0218325 A1* | 9/2006 | Hansen | 710/72 |
| 2008/0100586 A1* | 5/2008 | Smart | 345/173 |

OTHER PUBLICATIONS

Notification of Transmittal of the International Search Report and the Written Opinion of the International Searching Authority, or the Declaration for PCT/IB2009/050694, mailed Jul. 3, 2009.

* cited by examiner

*Primary Examiner* — Amr Awad
*Assistant Examiner* — Stephen Bray
(74) *Attorney, Agent, or Firm* — Snyder, Clark, Lesch & Chung, LLP (57) ABSTRACT

A method performed by a device having a touch panel may include detecting a touch on the touch panel, determining a dimension of the touch, identifying the touch as a standard tap or a full tap based on the dimension of the touch, and generating a command signal based on the identifying of the touch as the standard tap or the full tap.

18 Claims, 8 Drawing Sheets

MULTIDIMENSIONAL NAVIGATION FOR TOUCH SENSITIVE DISPLAY

BACKGROUND

The proliferation of devices, such as handheld devices, has grown tremendously within the past decade. A majority of these devices include some kind of display to provide a user with visual information. These devices may also include an input device, such as a keypad, touch screen, and/or one or more buttons to allow a user to enter some form of input. One-handed interaction can be beneficial for handheld devices as it enables a user to use their phone while keeping another hand free to do other things.

SUMMARY

In one implementation, a method, performed by a device having a touch panel, may include detecting a touch on the touch panel, determining a dimension of the touch, identifying the touch as one of a standard tap or a full tap based on the dimension of the touch, generating a command signal based on identifying the touch as one of the standard tap or the full tap, and performing an action based on the command signal.

Additionally, determining the dimension of the touch may include determining a horizontal dimension of the touch, and determining a vertical dimension of the touch.

Additionally, determining the dimension of the touch may include determining if there is symmetry between two dimensions of the touch.

Additionally, the touch panel may include a capacitive touch panel.

Additionally, the touch panel may include projection scanning technology.

Additionally, the method may further include determining a touch baseline for a standard tap or a full tap of a particular user.

Additionally, user input for the touch baseline may be passively obtained.

In another implementation, a device may include a display to display information, a touch panel to identify a touch on the touch panel, processing logic to interpret the touch as one of a standard tap or a full tap, processing logic to generate a command signal based on the interpretation of the touch as the standard tap or the full tap, and processing logic to alter the display based on the command signal.

Additionally, the touch panel may include a capacitive touch panel.

Additionally, the touch panel may include projection scanning technology.

Additionally, the processing logic to interpret the touch as one of a standard tap or a full tap may determine a horizontal dimension of the touch and a vertical dimension of the touch.

Additionally, the processing logic to interpret the touch as one of a standard tap or a full tap may determine if there is symmetry between two dimensions of the touch.

Additionally, the touch panel may be overlaid on the display.

Additionally, the device may further include a housing, where the touch panel and the display are located on separate portions of the housing.

Additionally, the device may further include processing logic to determine a touch baseline for a particular user, and a memory to store the touch baseline.

Additionally, the device may further include a memory to store standard tap or full tap dimensions appropriate for a median range of prospective users, where the processing logic to interpret the touch compares the touch on the touch panel to the standard tap or full tap dimensions.

Additionally, the touch panel may further include optical technology or pressure sensitive technology to determine the dimension of the touch.

In another implementation, a device may include means for displaying an image on a display, means for detecting a touch on a touch panel associated with the display, means for determining a dimension of the touch, means for identifying a type of the touch based on the dimension of the touch, means for identifying coordinates of the touch on the touch panel, means for associating the coordinates of the touch with the image displayed on the display, and means for generating a command signal based on the type of the touch and the coordinates of the touch associated with the image displayed on the display.

Additionally, the type of the touch may be one of a standard tap or a full tap.

Additionally, the device may further include means for establishing a touch baseline for one of a standard tap or a full tap, where the means for identifying a type of the touch compares the dimension of the touch to the touch baseline.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

The term "touch," as used herein, may refer to a touch of a deformable object, such as a body part (e.g., a finger) or a deformable pointing device (e.g., a soft stylus, pen, etc.). A touch may be deemed to have occurred if a sensor detects a touch, by virtue of the proximity of the deformable object to the sensor, even if physical contact has not occurred. The term "touch screen," as used herein, may refer not only to a touch-sensitive screen, but a screen that may signal a touch when the finger or the deformable object is close to the screen (e.g., a capacitive screen, a near field screen).

Touch screens may be used in many electronic devices, such as cellular telephones, personal digital assistants (PDAs), smartphones, portable gaming devices, media player devices, camera devices, etc. Touch screen technology generally relies on the two dimensions of the touch surface (i.e., up/down and left/right) to accept navigational commands. When an image is being view on the touch screen, these two dimensions are typically reserved for panning the image. Thus, other commands, such as zooming in/out may need to be placed in menus, on additional hardware, or as widgets.

Some touch screen technologies provide two-fingered gestures, such as a pinch/spread motion to indicate a zoom command for a displayed image. However, for a handheld electronic device, a two-fingered gesture typically requires two hands, since one hand is occupied by holding the handheld electronic device. For one-handed operation of a handheld electronic device, only one finger (typically a user's thumb) is available to provide touch screen input while the user is holding the handheld electronic device.

Figure 1A:
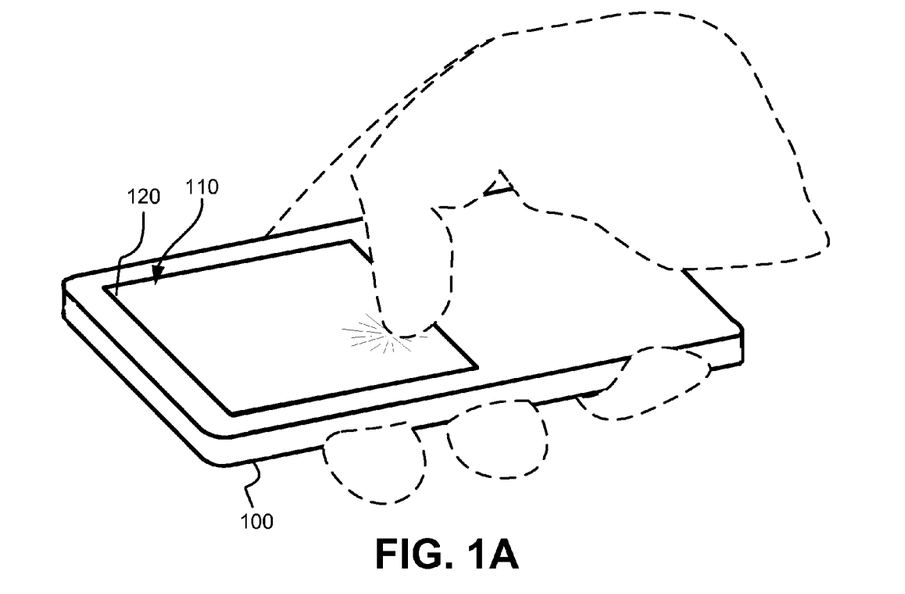
FIGS. 1A and 1B are schematics illustrating exemplary implementations of the systems and methods described herein.
Figure 1B:
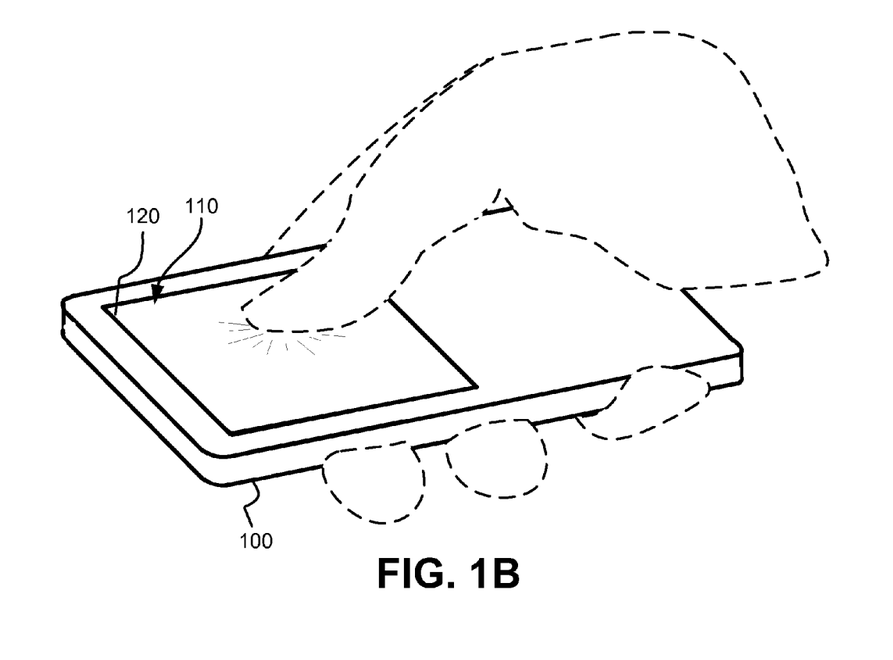

FIGS. 1A and 1B are schematics illustrating exemplary implementations of the systems and methods described herein. Implementations described herein may utilize touch-recognition techniques that distinguish between a touch input with a finger/thumb tip (a "standard tap") and a touch input with a broader finger portion (a "full tap"). Referring collectively to FIGS. 1A and 1B, electronic device 100 may include a display 110 and a touch panel 120 overlaying display 110. More details of electronic device 100 are provided with respect to FIGS. 2-4.

FIG. 1A illustrates a standard tap input applied to electronic device 100. The surface area of the portion of a user's thumb that contacts touch panel 120 during a standard tap may generally be described as generally symmetrical and relatively small (in comparison to the surface area from a full tap). FIG. 1B illustrates a full tap input applied to electronic device 100. The surface area of the portion of a user's thumb that contacts touch panel 120 during a full tap may generally be described as essentially asymmetrical and relatively large (in comparison to the surface area from a standard tap). Implementations of such distinctions may provide new user interface possibilities for handheld electronic devices with touch screens that can distinguish between a standard tap and a full tap.

In implementations described herein, a touch or a set of touches on a touch screen may be identified as a variable input signal depending on the type of touch (e.g., a standard tap or a full tap). A standard tap may represent a different type of input signal than a full tap. The input signal may be utilized in a variety of different ways to facilitate a user interface for a device with a touch screen. For example, a standard tap may be used to choose a link on a web page in a web browser, and a standard tap dragged along touch panel 120 could also be used to pan the web page. A full tap may be used to provide an options menu for the web page (e.g., copy a picture); while a full tap dragged vertically along touch panel 120 could be used as a zoom command, and a full tap dragged horizontally could be used as a command to go forward/backward in the web browser history. Similar input distinctions may be used for manipulations of images, such as images provided by a photo-viewing application.

As a further example, a standard tap on a display may be used to indicate a command to enter a program, while a full tap on the same display may open an option menu. As another example, a standard tap may generally mimic a user input of a left side of a two button input device (such a computer mouse) while a full tap may mimic the right side button of the same device. In another example, the distinction between a tap and a push may be used to differentiate between different command functions in a gaming environment.

Exemplary Device

Figure 2:
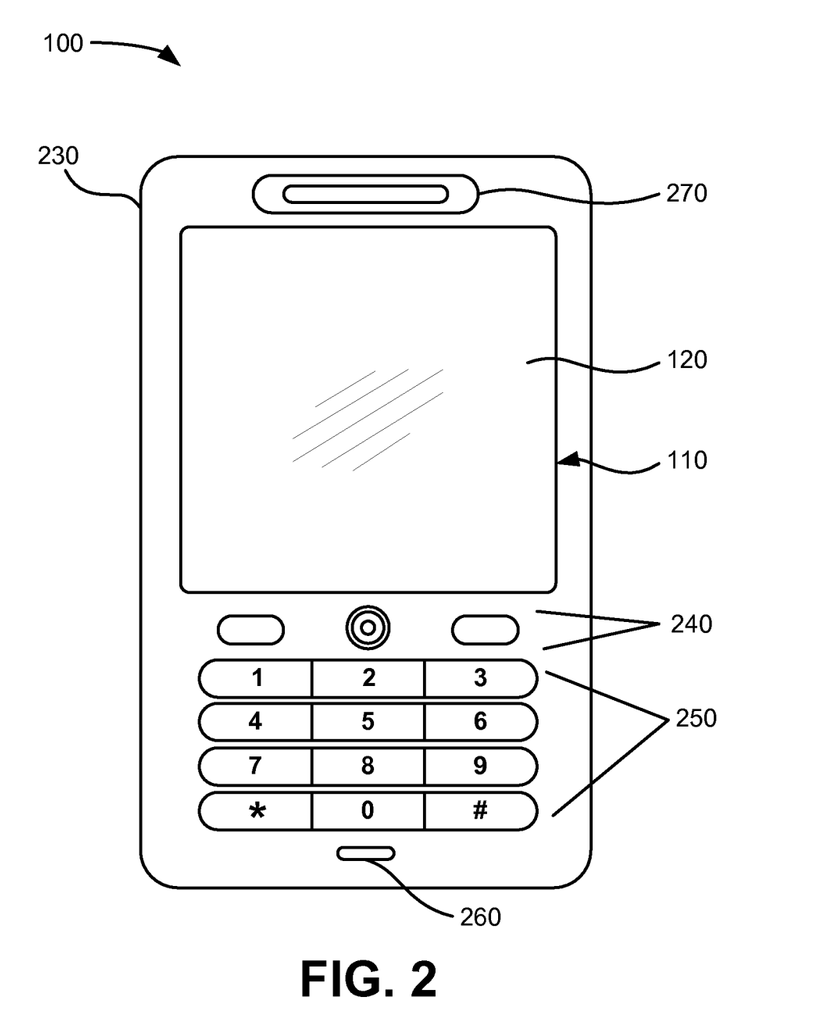
FIG. 2 is a diagram of an exemplary electronic device in which methods and systems described herein may be implemented.

FIG. 2 is a diagram of an exemplary electronic device 100 in which methods and systems described herein may be implemented. Implementations are described herein in the context of an electronic device having a touch screen. As used herein, the term "electronic device" may include a cellular radiotelephone; a smart phone, a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a gaming device; a media player device; or a digital camera. While implementations herein are described in the context of a handheld electronic device having a touch screen, other implementations may include other touch-screen-enabled devices that include a touch-panel or touch-screen interface, such as a desktop, laptop or palmtop computer.

Referring to FIG. 2, electronic device 100 may include display 110, touch panel 120, housing 230, control buttons 240, keypad 250, microphone 260, and speaker 270. The components described below with respect to electronic device 100 are not limited to those described herein. Other components, such as connectivity ports, memory slots, and/or additional speakers, may be located on electronic device 100.

Display 110 may include a device that can display signals generated by electronic device 100 as text or images on a screen (e.g., a liquid crystal display (LCD), cathode ray tube (CRT) display, organic light-emitting diode (OLED) display, surface-conduction eletro-emitter display (SED), plasma display, field emission display (FED), bistable display, etc.). In certain implementations, display 110 may provide a high-resolution, active-matrix presentation suitable for the wide variety of applications and features associated with typical mobile devices.

Display 110 may provide visual information to the user and serve—in conjunction with touch panel 120—as a user interface to detect user input. For example, display 110 may provide information and menu controls regarding incoming or outgoing telephone calls and/or incoming or outgoing electronic mail (e-mail), instant messages, short message service (SMS) messages, etc. Display 110 may further display information and controls regarding various applications executed by electronic device 100, such as a web browser, a phone book/contact list program, a calendar, an organizer application, image manipulation applications, navigation/mapping applications, as well as other applications. For example, display 110 may present information and images associated with application menus that can be selected using multiple types of input commands. Display 110 may also display images associated with a camera, including pictures or videos taken by the camera and/or received by electronic device 100. Display 110 may also display video games being played by a user, downloaded content (e.g., news, images, or other information), etc.

As shown in FIG. 2, touch panel 120 may be integrated with and/or overlaid on display 110 to form a touch screen or a panel-enabled display that may function as a user input interface. For example, in one implementation, touch panel 120 may include a near field-sensitive (e.g., capacitive), acoustically-sensitive (e.g., surface acoustic wave), photo-sensitive (e.g., infra-red), and/or any other type of touch panel overlay that allows display 110 to be used as an input device. Generally, touch panel 120 may include any kind of technology that provides the ability to identify dimensions of a portion of deformable object as an input that is registered on the surface of touch panel 120. Touch panel 120 may also include the ability to identify movement of a body part or a pointing device as it moves on or near the surface of touch panel 120.

In one embodiment, touch panel 120 may include a capacitive touch overlay including multiple touch sensing points capable of sensing a touch at the same time. An object having capacitance (e.g., a user's thumb) may be placed on or near touch panel 120 to form a capacitance between the object and one or more of the touch sensing points. The amount and location of touch sensing points may be used to determine touch coordinates (e.g., location) and to approximate dimensions of the touch. The touch coordinates may be associated with a portion of display 110 having corresponding coordinates.

In another implementation, optical touch panel technology that can identify individual pixels may be used to similar effect. In still another implementation, touch panel 120 may include a camera under the surface of the touch panel to collect images that can be used to identify the dimensions of a touch. In still another implementation, force-detection technology may be used where multiple pressure-sensitive nodes/pixels may be used to detect the presence and dimensions of a touch.

In another embodiment, touch panel 120 may include projection scanning technology, such as infra-red touch panels or surface acoustic wave panels that can identify, for example, horizontal and vertical dimensions of a touch on the touch panel. In an infra-red touch panel, light beams are sent by light emitting diodes (LEDs) horizontally and vertically over the touch panel. When the panel is touched, some of the light beams emanating from the light emitting diodes can be interrupted. Light sensors located across from the LEDs detect light changes and send this information to the controller for processing. Similarly, in a surface acoustic wave touch panel, ultrasonic waves may be sent by transducers horizontally and vertically over the touch panel. When the panel is touched, the acoustic energy of the waves can be absorbed. Sensors located across from the transducers detect this change and send the information to a controller for processing. For either infra-red or surface acoustic wave panels, the number of horizontal and vertical sensors (e.g., acoustic or light sensors) detecting the touch may be used to approximate dimensions of the touch.

In other implementations, touch panel 120 may be smaller or larger than display 110. In still other implementations, touch panel 120 may not overlap the area of display 110, but instead may be located elsewhere on the surface of handheld electronic device 100. In other embodiments, touch panel 120 may be divided into multiple touch panels, such as touch panels in strips around the edge of display 110.

Housing 230 may protect the components of electronic device 100 from outside elements. Control buttons 240 may also be included to permit the user to interact with electronic device 100 to cause electronic device 100 to perform one or more operations, such as place a telephone call, play various media, access an application, etc. For example, control buttons 240 may include a dial button, hang up button, play button, etc. One of control buttons 240 may be a menu button that permits the user to view various settings on display 110. In one implementation, control keys 140 may be pushbuttons.

Keypad 250 may also be included to provide input to electronic device 100. Keypad 150 may include a standard telephone keypad. Keys on keypad 150 may perform multiple functions depending upon a particular application selected by the user. In one implementation, each key of keypad 250 may be, for example, a pushbutton. A user may utilize keypad 250 for entering information, such as text or a phone number, or activating a special function. Alternatively, keypad 250 may take the form of a keyboard that may facilitate the entry of alphanumeric text.

Microphone 260 may receive audible information from the user. Microphone 260 may include any component capable of transducing air pressure waves to a corresponding electrical signal. Speaker 270 may provide audible information to a user of electronic device 100. Speaker 270 may include any component capable of transducing an electrical signal to a corresponding sound wave. For example, a user may listen to music through speaker 270.

Figure 3:
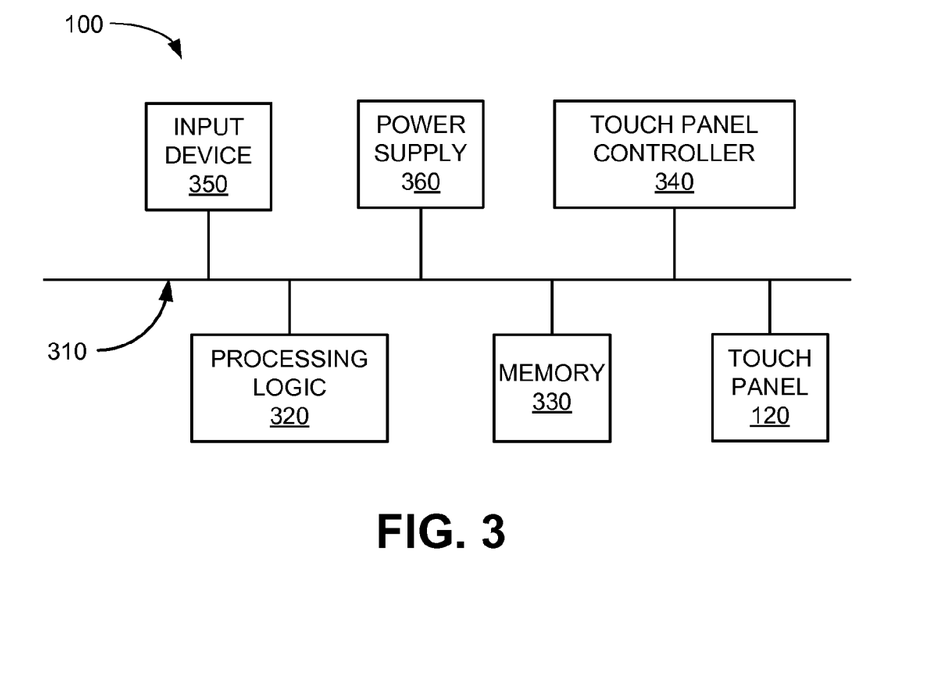
FIG. 3 is a block diagram illustrating components of the electronic device of FIG. 2 according to an exemplary implementation.

FIG. 3 is a block diagram illustrating components of electronic device 100 according to an exemplary implementation. Electronic device 100 may include bus 310, processing logic 320, memory 330, touch panel 120, touch panel controller 340, input device 350, and power supply 360. Electronic device 100 may be configured in a number of other ways and may include other or different components. For example, electronic device 100 may include one or more output devices, modulators, demodulators, encoders, and/or decoders for processing data.

Bus 310 may permit communication among the components of electronic device 100. Processing logic 320 may include a processor, a microprocessor, an application specific integrated circuit (ASIC), a field programmable gate array (FPGA), or the like. Processing logic 320 may execute software instructions/programs or data structures to control operation of electronic device 100.

Memory 330 may include a random access memory (RAM) or another type of dynamic storage device that may store information and instructions for execution by processing logic 320; a read only memory (ROM) or another type of static storage device that may store static information and instructions for use by processing logic 320; a flash memory (e.g., an electrically erasable programmable read only memory (EEPROM)) device for storing information and instructions; and/or some other type of magnetic or optical recording medium and its corresponding drive. Memory 330 may also be used to store temporary variables or other intermediate information during execution of instructions by processing logic 320. Instructions used by processing logic 320 may also, or alternatively, be stored in another type of computer-readable medium accessible by processing logic 320. A computer-readable medium may include one or more physical or logical memory devices.

Touch panel 120 may accept touches from a user that can be converted to signals used by electronic device 100. Touch coordinates on touch panel 120 may be communicated to touch panel controller 340. Data from touch panel controller 340 may eventually be passed on to processing logic 320 for processing to, for example, associate the touch coordinates with information displayed on display 110.

Touch panel controller 340 may include hardware- and/or software-based logic to identify input received at touch panel 120. For example, touch panel controller may identify which sensors may indicate a touch on touch panel 120 and the location of the sensors registering the touch. In one implementation, touch panel controller 340 may be included as part of processing logic 320.

Input device 350 may include one or more mechanisms in addition to touch panel 120 that permit a user to input information to electronic device 100, such as microphone 260, keypad 250, control buttons 240, a keyboard, a gesture-based device, an optical character recognition (OCR) based device, a joystick, a virtual keyboard, a speech-to-text engine, a mouse, a pen, voice recognition and/or biometric mechanisms, etc. In one implementation, input device 350 may also be used to activate and/or deactivate touch panel 120.

Power supply 360 may include one or more batteries or another power source used to supply power to components of electronic device 100. Power supply 360 may also include control logic to control application of power from power supply 360 to one or more components of electronic device 100.

Electronic device 100 may provide a platform for a user to view images; make and receive telephone calls; send and receive electronic mail and/or text messages; play various media, such as music files, video files, multi-media files, and/or games; and execute various other applications. Electronic device 100 may perform these operations in response to processing logic 320 executing sequences of instructions contained in a computer-readable medium, such as memory 330. Such instructions may be read into memory 330 from another computer-readable medium. In alternative embodiments, hard-wired circuitry may be used in place of or in combination with software instructions to implement operations described herein. Thus, implementations described herein are not limited to any specific combination of hardware circuitry and software.

Figure 4:
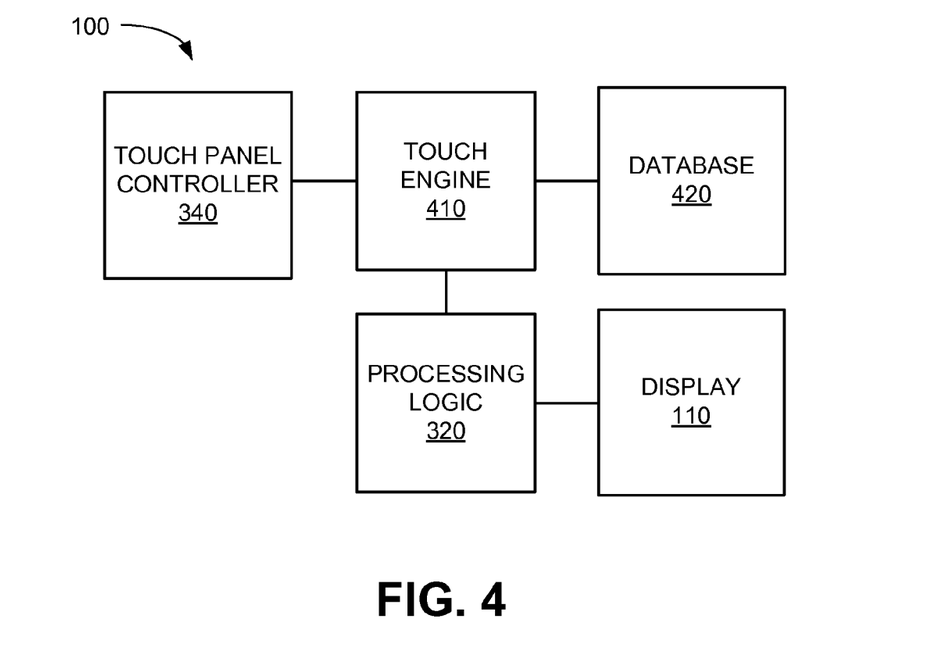
FIG. 4 is functional block diagram of the electronic device of FIG. 3.

FIG. 4 is a functional block diagram of exemplary components that may be included in electronic device 100. As shown, electronic device 100 may include touch panel controller 340, touch engine 410, database 420, processing logic 320, and display 110. In other implementations, electronic device 100 may include fewer, additional, or different types of functional components than those illustrated in FIG. 3 (e.g., a web browser).

Touch panel controller 340 may identify touch coordinates from touch panel 120. Coordinates from touch panel controller 340, including the identity of particular sensors in, for example, the X and Y dimensions, may be passed on to touch engine 410 to associate the touch coordinates with, for example, horizontal and/or vertical dimensions of the touch.

Touch engine 410 may include hardware and/or software for processing signals that are received at touch panel controller 340. More specifically, touch engine 420 may use the signal received from touch panel controller 340 to detect touches on touch panel 120 and determine dimensions of the touches so as to differentiate between types of touches. Touch engine 410 may also evaluate the symmetry of the touch dimensions to determine the type of touch. The touch detection, the dimensions, and the touch location may be used to provide a variety of user input to electronic device 100.

Database 420 may be included, for example, in memory 230 (FIG. 2) and act as an information repository for touch engine 410. For example, touch engine 410 may associate dimensions of different touches on touch panel 120 with particular touch dimensions (such as a touch baseline described later herein) stored in database 410.

Processing logic 220 may implement changes on display 110 based on signals from touch engine 410. For example, in response to signals that are received at touch panel controller 340, touch engine 410 may cause processing logic 320 to display a menu that is associated with an item previously displayed on display 110 at one of the touch coordinates. In another example, touch engine 410 may cause processing logic 320 to accept and/or transmit information (e.g., a video, a picture, a piece of music, a link, text, a document, etc.) from and/or to a remote device (e.g., server).

Figure 5A:
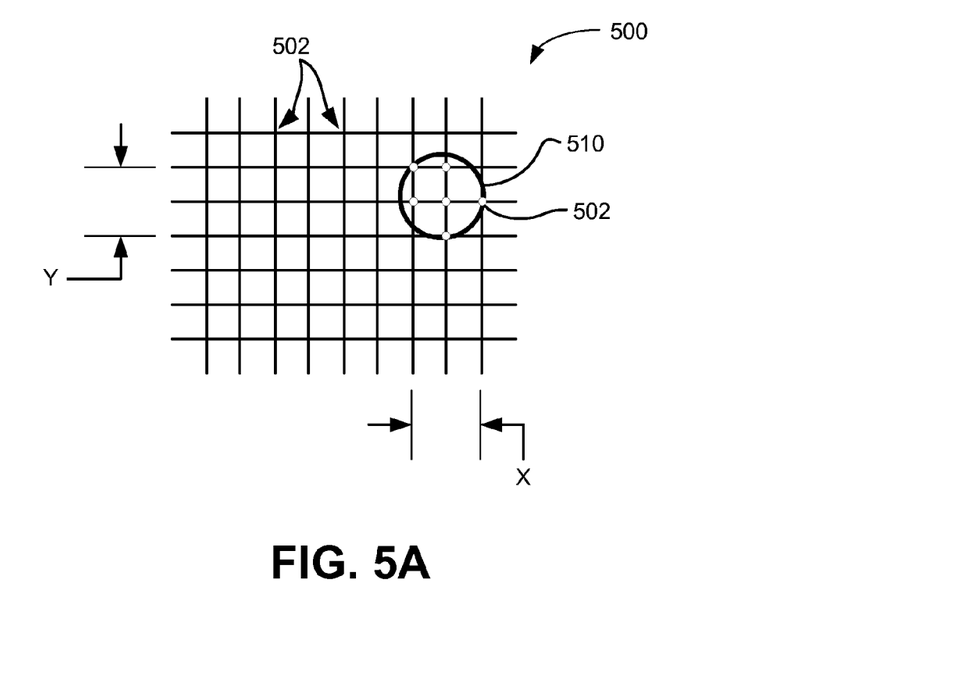
FIGS. 5A and 5B are diagrams illustrating exemplary touch patterns on the surface of an exemplary electronic device.
Figure 5B:
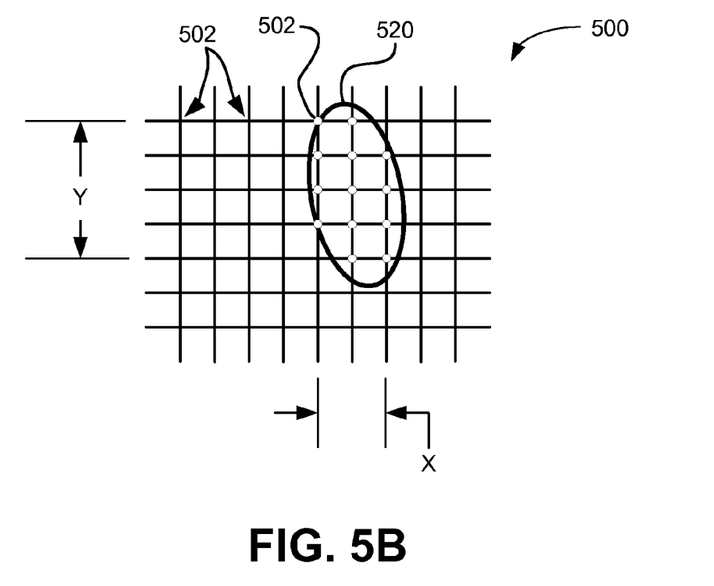

FIGS. 5A and 5B are diagrams illustrating exemplary touch patterns on the surface 500 of a touch panel 120 of an exemplary electronic device. FIG. 5A is a diagram illustrating an exemplary standard tap touch pattern. FIG. 5B is a diagram illustrating an exemplary full tap touch pattern.

Referring collectively to FIGS. 5A and 5B, a touch panel (such as touch panel 120 of FIG. 1) may generally include surface 500 configured to detect a touch at one or more sensing nodes 502. In one embodiment, surface 500 may include sensing nodes 502 using a grid arrangement of transparent conductors to track approximate horizontal (e.g., "X") and vertical (e.g., "Y") dimensions, as shown in FIGS. 5A and 5B. In other implementations, other arrangements of sensing nodes 502 may be used, including polar coordinates, parabolic coordinates, etc. Each sensing node 502 may represent a different position on surface 500 of the touch panel, and each sensing node 502 may be capable of generating a signal at the same time. The number and configuration of sensing nodes 502 may vary depending on the required accuracy/sensitivity of the touch panel. Generally, more sensing nodes can increase accuracy/sensitivity of the touch panel. A signal may be produced when an object (e.g., a user's finger) touches region of surface 500 over a sensing node 502. When an object is placed over multiple sensing nodes 502 or when the object is moved between or over multiple sensing nodes 502, multiple signals can be generated.

Referring to FIG. 5A, standard tap touch area 510 is shown covering six sensing nodes 502. Each of the six sensing nodes within standard tap touch area 510 may generate a signal indicating a touch has occurred. The location of these six sensing nodes may be used to identify particular dimensions of the touch. Particularly, a height and a width dimension may be identified based on known locations and spacing of the sensing nodes within standard tap touch area 510. Also, a symmetrical pattern of the six sensing nodes can be identified.

Referring to FIG. 5B, full tap touch area 520 is shown covering thirteen sensing nodes 502. Each of the thirteen sensing nodes within full tap touch area 520 may generate a signal indicating a touch has occurred. The location of these thirteen sensing nodes may be used to identify particular dimensions of the touch. Particularly, a height and a width dimension may be identified based on known locations and spacing of the sensing nodes within full tap touch area 520. Also, an asymmetrical pattern of the thirteen sensing nodes can be identified.

As shown in FIGS. 5A and 5B, measurements for dimensions of a touch may be obtained using a touch panel that can sense multiple nodes, such as a capacitive or projected capacitive touch panel. In other embodiments, measurements may be obtained using other technologies that can generally generate signals to indicate dimensions or shapes of a touch. Such technologies may include surface acoustic wave technologies, infra-red technologies, or optical technologies.

Figure 6A:
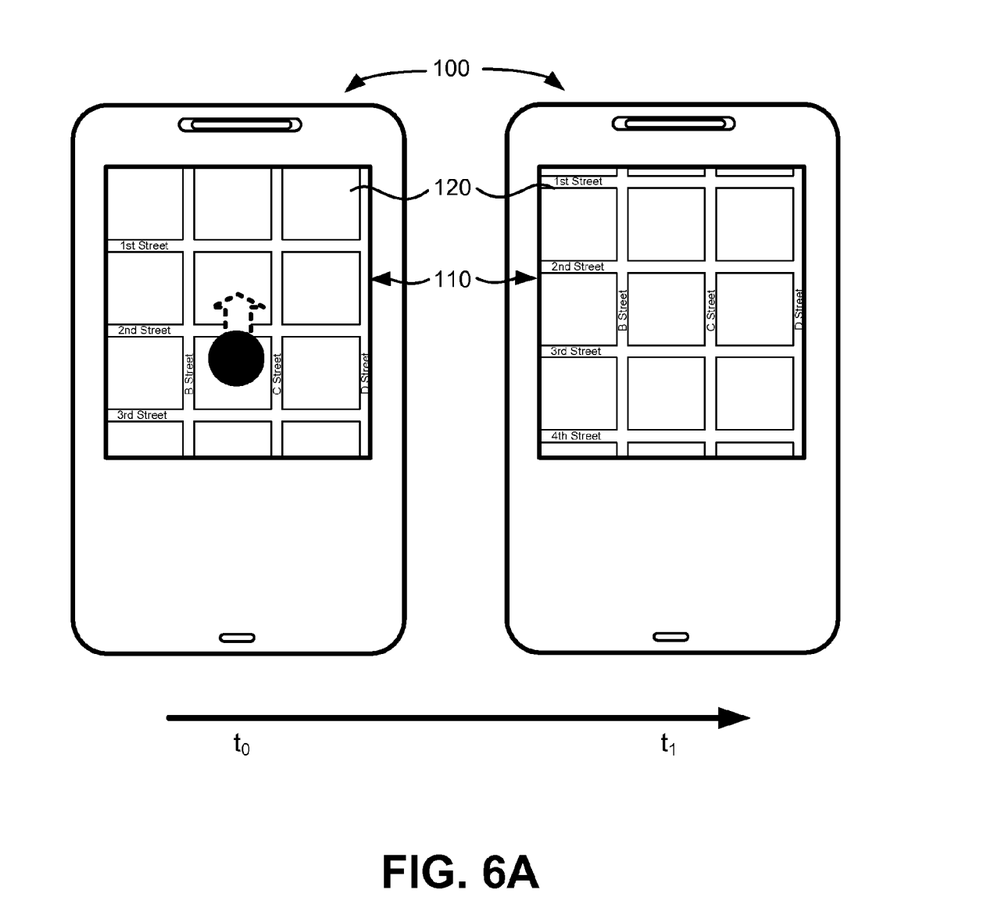
FIG. 6A shows an exemplary standard tap input on the surface of a display as a function of time.
Figure 6B:
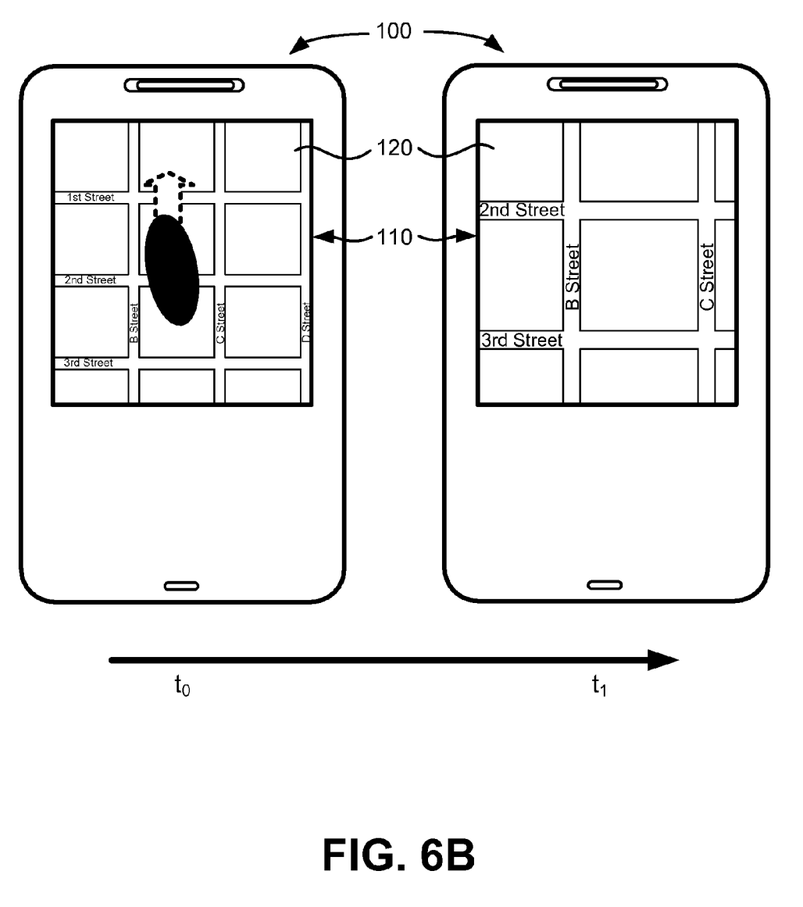
FIG. 6B shows an exemplary full tap input on the surface of a display as a function of time.

FIGS. 6A and 6B show exemplary applications of user multiple touch inputs. FIG. 6A shows an exemplary standard tap input on the surface of a display as a function of time, and FIG. 6B shows an exemplary full tap input on the surface of a display as a function of time.

Referring to FIG. 6A, a user may provide a touch input on the touch panel 120 of electronic device 100 at time $t_0$. Electronic device 100 may identify the dimensions of the touch input on touch panel 120 and determine that the input is in the form of a standard tap. The user may slide his touch finger forward on the surface of touch panel 120, and electronic device 100 may interpret the input as a command to pan upwards an image displayed on display 110. Thus, at time $t_1$, the displayed image has been adjusted on the screen to reflect a panning motion by the user.

Referring to FIG. 6B, the user may provide a touch input on the touch panel 120 of electronic device 100 at time $t_0$. Electronic device 100 may identify the dimensions of the touch input on touch panel 120 and determine that the input is in the form of a full tap. The user may slide his touch finger forward on the surface of touch panel 120, and electronic device 100 may interpret the input as a command to zoom in on an image displayed on display 110. Thus, at time $t_1$, the displayed image has been adjusted on the screen to reflect a zooming motion by the user. In one implementation, the initial location of the full tap may be used to determine the center point of the zoomed image.

Figure 7:
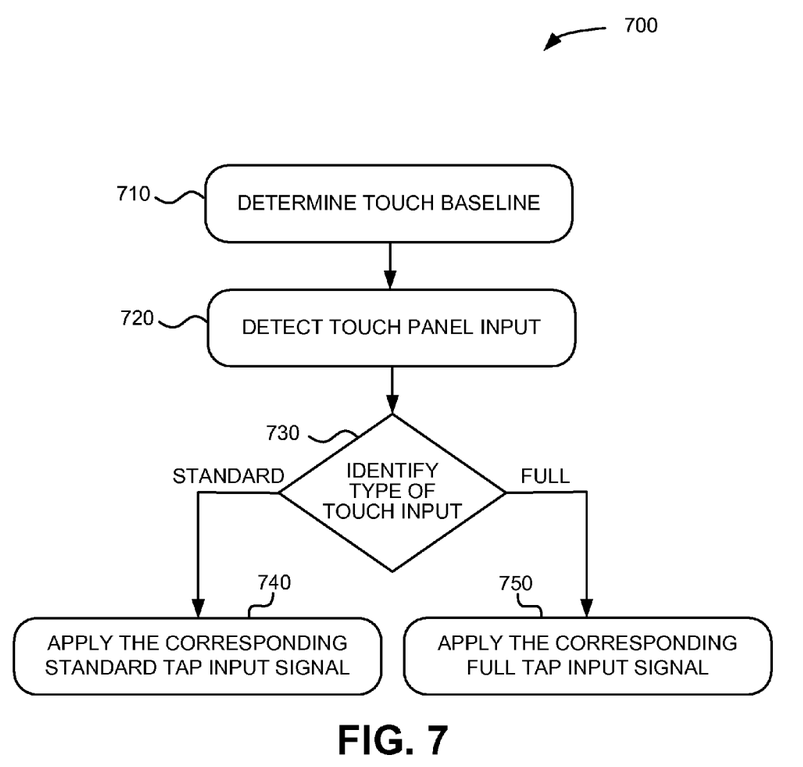
FIG. 7 is a flow diagram illustrating exemplary operations associated with the exemplary electronic device of FIG. 2.

FIG. 7 is a flow diagram 700 illustrating exemplary operations associated with an electronic device having a touch panel. For example, the operations may be performed by electronic device 100 of FIG. 1, including touch panel 120.

A touch baseline may be determined (block 710). For example, electronic device 100 may identify dimensions of a standard tap and/or a full tap for a particular user. Touch baseline information may be collected in a variety of ways. For example, electronic device 100 may be configured to require a tap on touch pad 120 (or a particular area of touch pad 120) during initial operation of electronic device 100. As another example, a biometric scan may be used to unlock electronic device 110, and the biometric scan may also serve as the touch baseline for, e.g., a full touch. As another example, a pass code entered via touch screen 120 may provide an opportunity to collect touch baseline information for, e.g., a standard tap. The foregoing examples may be used to passively establish dimensions of a presumed standard touch of a user (that is, the user is not actively requested to provide touch baseline information). A touch baseline may be established at the beginning of each user session (e.g., every time a user unlocks electronic device 100) or once during initial configuration of the device. In another implementation, an actual calibration menu may be used to actively request and identify a standard tap and/or a full tap for a particular user. In still another implementation, touch baseline information may be pre-loaded to include standard tap and/or full tap dimensions appropriate for a median range of prospective users. In some implementations, only a standard touch dimension or a full touch dimensions may need to be expressly established, while the other type of touch may be determined by comparing with the measured touch baseline.

An input to the touch panel may be detected (block 720). For example, electronic device 100 may detect a touch from a user on touch panel 120. The type of input may be identified (block 730). For example, electronic device 100 may identify the type of input (e.g., a standard tap or a full tap) to determine the appropriate signal to send from processing logic 220 to other system components. The type of input may be based on the touch baseline established in block 710. For example, if the touch input generates a single or small group of symmetrical coordinates (as described in more detail with respect to FIG. 5A), a standard tap input may be identified. If the touch input generates a larger group of coordinates than expected for a standard tap (as described in more detail with respect to FIG. 5B), a full tap input may be identified.

If a standard tap input is determined, an input signal corresponding to a standard tap may be applied (block 740). For example, in the context of a web browser application, electronic device 100 may apply a corresponding standard tap input signal to access a link in a web page. If a full tap input is determined, an input signal corresponding to a full tap may be applied (block 750). For example, in the context of the same web browser application of block 740, electronic device 100 may apply a corresponding full tap input signal to open a menu relevant to the link on the web page.

Figure 8:
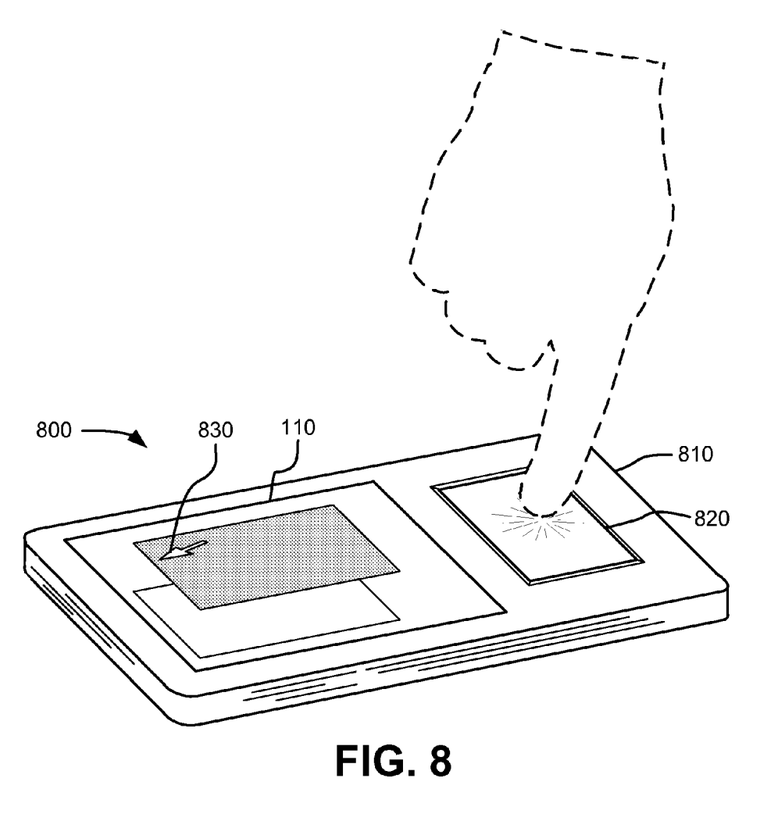
FIG. 8 is a diagram of another exemplary electronic device in which methods and systems described herein may be implemented.

FIG. 8 is a diagram of exemplary electronic device 800 in which methods and systems described herein may be implemented. Electronic device 800 may include housing 810, display 110, and touch pad 820. Other components, such as control buttons, a keypad, a microphone, a camera, connectivity ports, memory slots, and/or additional speakers, may be located on electronic device 800, including, for example, on a rear or side panel of housing 810. FIG. 8 illustrates touch panel 820 being separately located from display 110 on housing 810. Touch panel 820 may include any touch screen technology providing the ability to distinguish between different surface areas of a body part or another deformable object as it touches the surface of touch panel 820. User input on touch panel 820 may be associated with display 110 by, for example, the movement and location of cursor 830.

Touch panel 820 may be operatively connected with display 110. For example, touch panel 820 may include a projection scanning touch panel that allows display 110 to be used as an input device. Generally, touch panel 820 may include any kind of technology that provides the ability to distinguish between different surface areas of a touch on the surface of touch panel 820. Touch panel 820 may include the ability to identify movement of a body part or pointing device as it moves on or near the surface of touch panel 820. As described above with respect to FIGS. 1A, 1B, 5A and 5B, a touch may be identified as a standard tap or a full tap. In the arrangement of FIG. 8, the standard tap or full tap may correspond to the location of cursor 830 on display 110. The standard tap or full tap may each be interpreted as a different type of input signal.

Conclusion

Implementations described herein may include a touch-sensitive interface for an electronic device that distinguishes between different kinds of touches, referred to herein as standard tap and full tap touches. The distinction can be made by measuring the dimensions of a standard tap and/or the dimensions of a full tap and comparing the size and/or shape of each touch. By distinguishing between the different kinds of touches, different forms of user input may be supplied using a single touch-sensitive interface.

The foregoing description of the embodiments described herein provides illustration and description, but is not intended to be exhaustive or to limit the invention to the precise form disclosed. Modifications and variations are possible in light of the above teachings or may be acquired from practice of the invention.

For example, implementations have been mainly described in the context of a mobile communication device. These implementations, however, may be used with any type of device with a touch-sensitive display including the ability to distinguish between surface areas of a touch.

As another example, implementations have been described with respect to certain touch panel technology. Other technology that can distinguish between surface areas of a touch may be used to accomplish certain implementations, such as different types of touch panel technologies, including but not limited to, surface acoustic wave technology, capacitive touch panels, infra-red touch panels, strain gauge mounted panels, optical imaging touch screen technology, dispersive signal technology, acoustic pulse recognition, and/or total internal reflection technologies. Furthermore, in some implementations, multiple types of touch panel technology may be used within a single device.

Further, while a series of blocks has been described with respect to FIG. 7, the order of the blocks may be varied in other implementations. Moreover, non-dependent blocks may be performed in parallel.

Aspects described herein may be implemented in methods and/or computer program products. Accordingly, aspects may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement these aspects is not limiting. Thus, the operation and behavior of the aspects were described without reference to the specific software code—it being understood that software and control hardware could be designed to implement the aspects based on the description herein.

Further, certain aspects described herein may be implemented as "logic" that performs one or more functions. This logic may include firmware, hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method for processing dual input from a single finger on a device having a touch panel, the method comprising:
    passively obtaining, from a preliminary touch on the touch panel to unlock the device, dimensions of a preliminary touch of a particular user;
    determining, based on the dimensions of the preliminary touch, a touch baseline for dimensions of a standard tap of the particular user;
    detecting a touch on the touch panel;
    determining a touch pattern of the touch;
    identifying the touch pattern as a standard tap from a first portion of the finger when the touch pattern corresponds to the touch baseline for the particular user;
    identifying the touch pattern as a full tap from a second portion of the finger when the touch pattern is of a second surface area, larger than the touch baseline for the particular user;
    generating a command signal based on the identifying the touch pattern as one of the standard tap or the full tap; and
    performing an action based on the command signal.

2. The method of claim 1, where determining the touch pattern of the touch comprises:
    determining a horizontal dimension of the touch, and
    determining a vertical dimension of the touch.

3. The method of claim 2, where determining the touch pattern of the touch further comprises:
    determining if there is symmetry between the horizontal and vertical dimensions of the touch.

4. The method of claim 1, where the touch panel includes a capacitive touch panel.

5. The method of claim 1, where the touch panel comprises projection scanning technology.

6. The method of claim 1, further comprising:
    detecting a direction of movement associated with the touch, wherein generating the command signal is further based on the direction of movement associated with the touch.

7. A device comprising:
    a display to display information;
    a touch panel to identify sizes and dimensions of touches on the touch panel; and
    a processor configured to:
        passively obtain, from a pass code entry operation on the touch panel to unlock the device, dimensions of a preliminary touch of a particular individual user;
        determine, based on the dimensions of the preliminary touch, a touch baseline for dimensions of a standard tap of the particular individual user;
        detect a touch on the touch panel,
        determine a surface area and a symmetry for a touch pattern corresponding to the touch from a finger of the particular individual user,
        identify, based on the touch baseline and the surface area and the symmetry for the touch pattern, the touch as a standard tap from a first portion of the finger or a full tap from a second portion of the finger,
        generate a command signal based on the identifying of the touch as the standard tap or the full tap, and
        alter the display based on the command signal.

8. The device of claim 7, where the touch panel includes a capacitive touch panel.

9. The device of claim 7, where the touch panel comprises projection scanning technology.

10. The device of claim 7, wherein, when determining the surface area and the symmetry for the touch pattern, the processor is configured determine a horizontal dimension of the touch and a vertical dimension of the touch.

11. The device of claim 10, wherein, when determining the surface area and the symmetry for the touch pattern, the processor is configured determine if there is symmetry between the vertical and horizontal dimensions of the touch.

12. The device of claim 7, where the touch panel is overlaid on the display.

13. The device of claim 7, further comprising:
    a housing, where the touch panel and the display are located on separate portions of the housing.

14. The device of claim 7, further comprising a memory to store the touch baseline.

15. The device of claim 7, further comprising:
a memory to store standard tap or full tap dimensions appropriate for a median range of prospective users, wherein the processor is configured to compare the touch pattern to the standard tap or full tap dimensions.

16. The device of claim 7, wherein the touch panel comprises one of optical technology or pressure sensitive technology to determine the dimension of the touch.

17. The device of claim 7, wherein the processor is further configured to:
detect a direction of movement associated with the touch, and
wherein, when generating the command signal, the processor is further configured to generate the command signal based on the direction of movement associated with the touch.

18. A non-transitory computer-readable memory comprising computer-executable instructions, the computer-readable memory comprising one or more instructions for:
obtaining, from a preliminary touch on a touch panel to unlock a device, dimensions of a preliminary touch of a particular user, from a first portion of a finger;
determining, based on the dimensions of the preliminary touch, a touch baseline for dimensions of a standard tap of the particular user;
detecting a touch, from the finger, on the touch panel;
determining a dimension of the touch;
identifying a type of the touch as being from the first portion of the finger or a second portion of the finger based on the dimension of the touch and the touch baseline;
identifying coordinates of the touch on the touch panel;
associating the coordinates of the touch with an image displayed on a display of the device; and
generating a command signal based on the type of the touch and the coordinates of the touch associated with the image displayed on the display.

* * * * *